US008948074B2

(12) United States Patent
Ni et al.

(10) Patent No.: US 8,948,074 B2
(45) Date of Patent: Feb. 3, 2015

(54) METHOD AND DEVICE FOR COOPERATIVE RELAY WITH MULTIPLE RELAY STATIONS IN WIRELESS TELECOMMUNICATION NETWORK

(75) Inventors: Wei Ni, Shanghai (CN); Gang Shen, Shanghai (CN); Shan Jin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 820 days.

(21) Appl. No.: 12/298,950

(22) PCT Filed: Apr. 27, 2007

(86) PCT No.: PCT/CN2007/001419
§ 371 (c)(1),
(2), (4) Date: Oct. 29, 2008

(87) PCT Pub. No.: WO2007/128220
PCT Pub. Date: Nov. 15, 2007

(65) Prior Publication Data
US 2009/0103472 A1 Apr. 23, 2009

(30) Foreign Application Priority Data

Apr. 29, 2006 (CN) .......................... 2006 1 0026261

(51) Int. Cl.
*H04W 88/04* (2009.01)
*H04B 7/155* (2006.01)
*H04B 7/26* (2006.01)

(52) U.S. Cl.
CPC .......... *H04B 7/15592* (2013.01); *H04B 7/2606* (2013.01); *H04W 88/04* (2013.01)
USPC .......................................................... 370/315

(58) Field of Classification Search
None
See application file for complete search history.

(56) References Cited

U.S. PATENT DOCUMENTS

| 7,542,439 | B2 * | 6/2009 | Rubin ........................... 370/315 |
| 7,673,219 | B2 * | 3/2010 | Molisch et al. ............... 714/772 |
| 7,826,573 | B2 * | 11/2010 | Yoon et al. .................... 375/349 |
| 2004/0005861 | A1 | 1/2004 | Tauchi |
| 2005/0014464 | A1 * | 1/2005 | Larsson ....................... 455/11.1 |

FOREIGN PATENT DOCUMENTS

| CN | 1233920 A | 11/1999 |
| CN | 1251706 A | 4/2000 |
| CN | 1901400 A | 1/2007 |

(Continued)

OTHER PUBLICATIONS

International Search Report for Application No. PCT/CN2007/001419.

(Continued)

*Primary Examiner* — Jianye Wu
(74) *Attorney, Agent, or Firm* — Fay Sharpe LLP (57) ABSTRACT

The invention provides a method and device for cooperative relay with multiple relay stations in the wireless telecommunication network. To be specific, according to the invention, in single-hop or multi-hop relay telecommunication link, the relay device and other relay devices within the same hop select space diversity or space multiplexing to carry out cooperative relay operation according to the processing indicating information from the base station, thus obtaining space diversity gain and space multiplexing gain.

16 Claims, 6 Drawing Sheets

(56) References Cited

FOREIGN PATENT DOCUMENTS

| EP | 0702462 A1 | 3/1996 |
| WO | WO 03/003672 | 1/2003 |
| WO | WO 2004/107693 | 12/2004 |

OTHER PUBLICATIONS

EP Search Report.

* cited by examiner

METHOD AND DEVICE FOR COOPERATIVE RELAY WITH MULTIPLE RELAY STATIONS IN WIRELESS TELECOMMUNICATION NETWORK

FIELD OF THE INVENTION

The present invention relates to the telecommunication network, and particularly to the relay device, base station and method for implementing the cooperative relay with multiple relay devices.

BACKGROUND OF THE INVENTION

Cooperative relay, as an emerging technology in the field of wireless telecommunication, has the basic idea of obtaining diversity effect via independent channels. In the cooperative relay network, the source node broadcasts the signals that it needs to transmit, and part of the relay devices deployed in the network can receive these signals, and consequently process and forward the signals. In multi-relay network, the signals forwarded by said relay devices will reach relay devices on the next hop, these relay devices will process and forward the signals again, at last, said signals reach the destination (the signal destination).

As a brand new field, the cooperative relay has limited solutions. As the cooperative relay needs to combine the signals from different relay stations, many solutions for cooperative relay require accurate synchronization and power match, which set high requirements for the real implementation of the system. Other solutions require specific channel conditions, such as the orthogonality between the channels, which increase the difficulty for design and measurement. In addition, the improvement of the performance obtained by cooperative relay is also subject to the channel condition.

SUMMARY OF THE INVENTION

The invention is proposed to solve the aforementioned problems in the existing technology.

According to the first aspect of the invention, there is provided a method, in a relay device in wireless telecommunication network, for performing the cooperative relay with multiple relay devices, comprising the following steps of: receiving the signals from the fore level network nodes; applying specific encoding and/or decoding methods to process said received signals according to the processing indicating information from the base station; sending said processed signals to the next level network nodes.

According to the second aspect of the invention, there is provided a relay device in wireless telecommunication network, for performing the cooperative relay with multiple relay devices, comprising: receiving means, for receiving the signals from the fore level network nodes; signal processing means, for applying specific coding and/or decoding methods to process said received signals according to the processing indicating information from the base station; sending means, for sending said processed signals to the next level network nodes.

According to the third aspect of the invention, there is provided a method, in the relay device in wireless telecommunication network, for implementing cooperative relay with multiple relay devices based on virtual multiple-input multiple-output, comprising the following steps of: receiving the signals from the fore level network nodes; applying specific channel processing operating method to carry out the channel processing operation on said received signals so as to generate signals after channel processing operation sending said signals after channel processing to the next level network nodes.

According to the fourth aspect of the invention, there is provided a relay device in wireless telecommunication network, for implementing cooperative relay with multiple relay devices based on virtual multiple-input and multiple-output, comprising: receiving means, for receiving the signals from the fore level network nodes; signal processing means, for applying specific channel processing operating method to carry out the channel processing operation on said received signals, so as to generate signals after channel processing; sending means, for sending said signals after channel processing operation to the next level network nodes.

According to the fifth aspect of the invention, there is provided a method in the base station in wireless network, for aiding the implementation of cooperative relay with multiple relay devices based on virtual multiple-input multiple-output, comprising the following steps of: receiving the signals from the fore level network nodes; performing the reverse channel processing operation on said signals from the fore level network nodes, so as to generate the signal sequence after reverse channel processing operation.

According to the sixth aspect of the invention, there is provided a base station in wireless network, for aiding the implementation of cooperative relay with multiple relay devices based on virtual multiple-input multiple-output, comprises: receiving means, for receiving the signals from the fore level network nodes; reverse channel processing operating means, for performing the reverse channel processing operation on said signals from the fore level network nodes, so as to generate the signals after reverse channel processing operation.

With the method and the corresponding device provided by the present invention space diversity or space multiplexing gain can be obtained when applying space diversity or space multiplexing.

BRIEF DESCRIPTION OF THE DRAWINGS

Further description of the invention is given as below referring to the figures.

DETAILED DESCRIPTION OF EMBODIMENTS

Detailed description of the invention is given as below with the combination of the figures.

Figure 1:
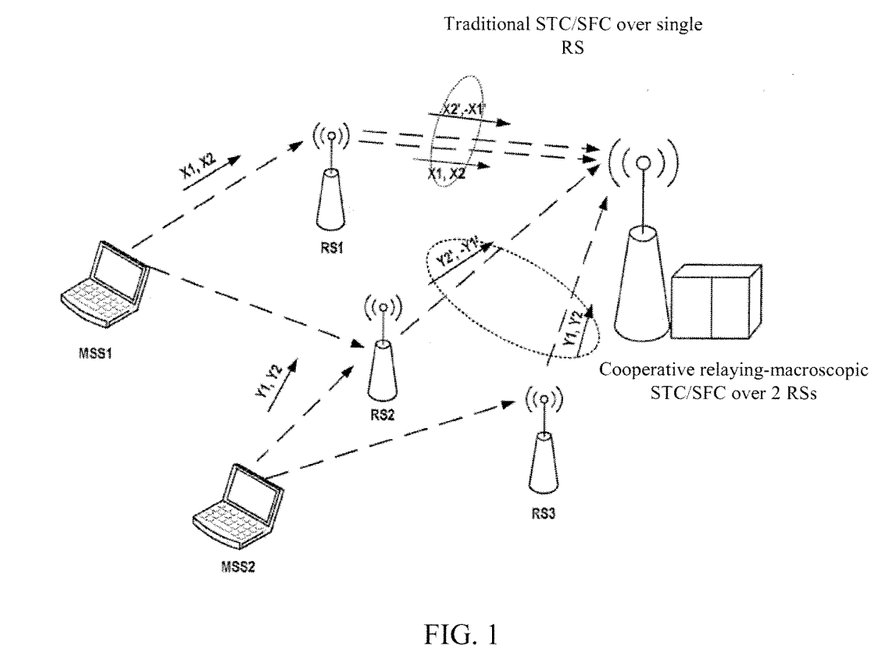
FIG. 1 is the topological diagram of the multi-relay network according to one embodiment of the invention.

FIG. 1 is the topological diagram of the multi-relay device according to one embodiment of the invention.

Wherein, 2 mobile stations MSS1, MSS2, 3 relay devices RS1, RS2, RS3 and a base station BS are shown. RS1 and RS2 serve MSS1, while RS2 and RS3 serve MSS2, which realize cooperative relay. The relay devices work as the remote antennas of the base station or the mobile station. For example, in the uplink, MSS2 in the upper part of FIG. 1 transmits signals to a set of relay devices RS1, RS2, after corresponding processing (for example, space-time coding STC or space-frequency coding SFC), the set of relay devices transmit the processed signals respectively.

As depicted in the figure, wherein the Traditional STC/SFC is the traditional single relay space-time (space-frequency) coding transmitting method. RS1 independently plays the role to relay the signals from MSS1. Therefore, when the signals from MSS1 (represented as [X1, X2]) reach RS1, RS1 encodes the signals, yields new signal sequence (represented as [X2', −X1']) and forwards the new signal sequence along with another branch of signals (for example, the original signals [X1, X2]) in the next hop (i.e., to the next level, for example, forward to BS).

When applying the cooperative relay with multiple relay devices, according to the present invention, at least two relay devices can be employed to respectively process and forward the signals from one signal source. The description below takes the uplink situation as examples, but this does not limit the protection scope of the invention, i.e., the present invention can also apply to the downlink situation. In FIG. 1, MSS2 in the lower part of FIG. 1 transmits the original signals to a set of relay devices RS2, RS3 that serve MSS2. If single-relay scheme is employed, then it is possible that the base station will choose one relay device to perform the relay service according to the wireless channel related parameter (for example, the ranging information), and then, the chosen relay device will apply the aforesaid signal processing method to process the signals and then forward them. While in the cooperative relay scheme with multiple relay devices, when the original signals from MSS2 (represented as [Y1,Y2]) reaches RS2 and RS3, the two relay devices process and forward the received signals respectively. In a preferred embodiment of the invention, RS3 forwards the original signal [Y1,Y2] to the base station on the next level, while RS2 processes the signal, generates a new signal sequence [Y2', −Y1'] and sends it to the base station.

Figure 2:
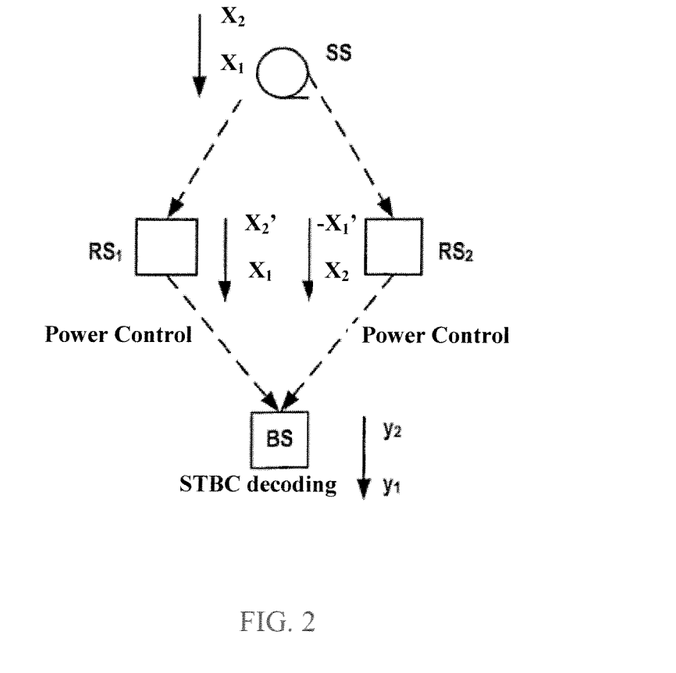
FIG. 2 is the diagram illustrates the uplink with two relay devices for cooperative relay according to one embodiment of the present invention.

FIG. 2 is the diagram illustrates the upping with two relay devices or cooperative relay according to one embodiment of the present invention Wherein, a mobile station SS sends the original data [X1,X2] to the relay devices RS1 and RS2 that are responsible for providing SS with cooperative relay service, RS1 and RS2 process the original data respectively, then generate a branch of signal sequence [X1, X2'] and [X2, −X1'] respectively, and send them to the next level network node in the next hop (i.e. the base station in the figure, BS). The signals received by the base station can be referred to as [Y1, Y2], which are given by the equation below:

$$y_1 = h_1 x_1 + h_2 x_2 + n_1$$

$$y_2 = h_1 x_2^* - h_2 x_1^* + n_2$$

Wherein, $h_1$ and $h_2$ represent the channel parameter corresponding to RS1 and RS2 respectively. The following expression can be easily obtained from the above equation:

$$x_1 = \frac{h_1^*(y_1 - n_1) - h_2(y_2^* - n_2^*)}{|h_1|^2 + |h_2|^2}; x_2 = \frac{h_2^*(y_1 - n_1) + h_1(y_2^* - n_2^*)}{|h_1|^2 + |h_2|^2}$$

It can be easily seen that, the diversity gain is available to the system if the difference between $h_1$ and $h_2$ are not too large. Otherwise, for example, if $|h_1| \gg |h_2|$, then $$x_1 \approx \frac{h_1^*(y_1 - n_1)}{|h_1|^2}$$

and $$x_2 = \frac{h_1(y_2^* - n_2^*)}{|h_1|^2},$$

which means the effects of cooperative relay are almost the same with that of the traditional single relay scheme. Preferably, in order to obtain diversity gain under such circumstances, power control on the relay devices is carried out by the base station, (the detailed implementation is similar to the power control on mobile stations therefore, signals from different RSs are in the same power level, and then received by the base station.

Figure 3:
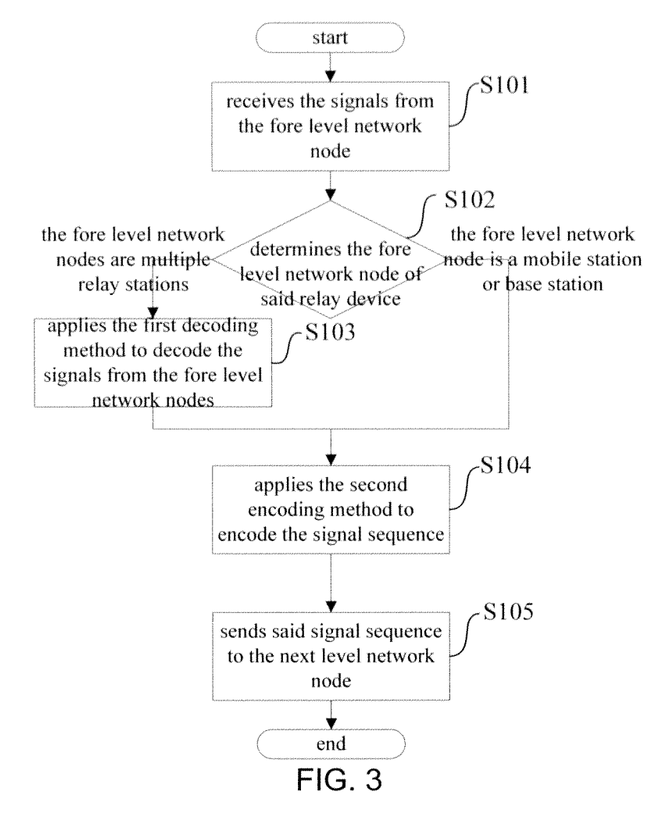
FIG. 3 is the flow chart of the method for implementing cooperative relay with multiple relay devices in the relay device in the wireless network according to an embodiment of the invention.

FIG. 3 is the flow chart of the method for implementing cooperative relay with multiple relay devices in the relay device in the wireless network according to an embodiment of the invention.

The method starts from step S101, in step S101, the relay device receives the signals from the fore level network node(s). According to the possible network topology, its fore level network node can be a mobile station, a base station or several relay devices, and as to different fore level network nodes, the relay device may carry out different operation on the signals arrived, therefore, the method needs to enter step S102.

In step S102, the relay device determines the fore level network node(s) according to the processing indicating information from the base station, for example, MAP information including the network topology and the signal processing method that each relay device applies. For example, from the MAP information, the relay device acknowledges the type(s) of the fore level network node(s), and also knows the signal processing methods of the fore level network node(s) correspondingly. As for the situation that the fore level network nodes comprise multiple relay devices, the consequent process on the signal by the relay device is different from the one in the situation that the fore level network node is a mobile station or a base station.

When it is determined that the fore level network nodes comprise multiple relay devices, the method enters the step S103.

In the step S103, according to said processing indicating information from the base station, the relay device decodes said received signals with the first decoding method corresponding to the first encoding method that said received signal employs. Wherein, the decoding method can be obtained from said processing indicating information from the base station. Then the decoded signal sequence is generated, and then the method enters the step S104.

In case that in the step S102, it is determined that the fore level network node is a mobile station or a base station, in general, the signals are original signals, therefore, the method enters the step S104 directly.

In the step S104, according to the processing indicating information from the base station including the information to indicate what encoding method the relay device should apply, etc., with specific second encoding method, the relay device encodes the signal sequence that decoded with the first decoding method in step S103 or the original signals from the base station or the mobile station, so as to generate the encoded signal sequence and enters step S105.

In step S105, the relay device transmits the encoded signals to the next level network node(s). Since the relay device has already known the type(s) and the specific encoding method(s) applied by the next level network node(s) from the processing indicating information sent by the base station, therefore, even if said next level network node is a mobile station, the signal encoded can still be received and detected by the receiver successfully.

Figure 4:
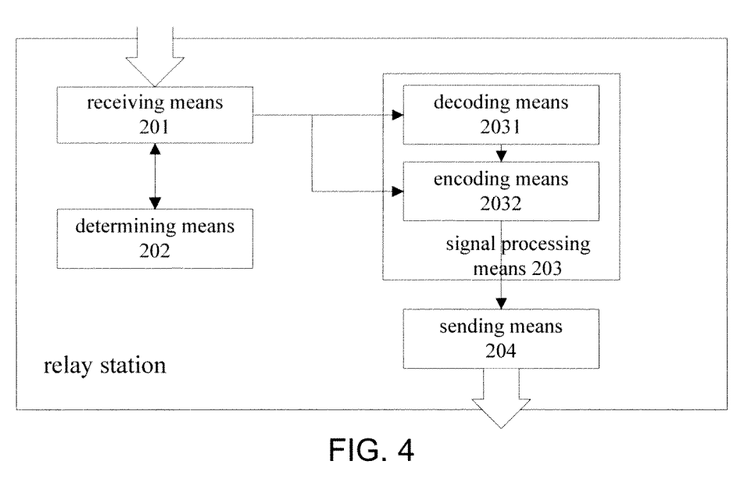
FIG. 4 is the block diagram of the relay device for implementing cooperative relay with multiple relay devices in the wireless network according to an embodiment of the invention.

FIG. 4 is the block diagram of the relay device for implementing cooperative relay with multiple relay devices in the wireless network according to an embodiment of the invention. The relay device comprises a receiving means 201, a determining means 202, information processing means 203 and a sending means 204, preferably, the information processing means 203 further comprises a decoding means 2031 and an encoding means 2032.

The receiving means 201 receives the signals from the fore level network node(s). According to the possible network topology its fore level network node(s) can be a mobile station a base station or several relay devices, and as to different fore level network nodes the relay device may carry out different operation on the signals arrived, therefore, the receiving means 201 needs the result determined by the determining means 202 to transmit said signals to the corresponding means.

The determining means 202 determines the fore level network node(s) according to the processing indicating information from the base station, for example, MAP information including the network topology and the signal processing method that each relay device applies. For example, from the MAP information, the determining means 202 acknowledges the type(s) of the fore level network node(s), and also knows the signal processing method(s) of the fore level network node(s) correspondingly. As for the situation that the fore level network nodes comprise multiple relay devices, the consequent process on the signal by the relay device is different from the one in the situation that the fore level network node is a mobile station or a base station.

When the determining means 202 determines that the fore level network nodes comprise multiple relay devices, the receiving means 201 transmit the obtained signals to a decoding means 2031;

The decoding means 2031, according to said processing indicating information from the base station, decodes said received signal with the first decoding method corresponding to the first encoding method that said received signal employs. Wherein, the decoding method can be obtained from said processing indicating information from the base station. Then, the decoded signal sequence is generated, and the decoded signal sequence can be conveyed to an encoding means 2032.

In case that the determining means 202 determines that the fore level network node is a mobile station or a base station, in general, the signals are original signals, therefore, the receiving means 201 transmits the received signal directly to the aforesaid encoding means 2032;

According to the processing indicating information from the base station including the information to indicate what encoding method the relay device should apply, etc., with specific second encoding method, the encoding means 2032 encodes the signal sequence that decoded with the first decoding method in the decoding means 2031 or the original signals from the base station or the mobile station, so as to generate the encoded signal sequence and transmits the encoded signal sequence to a sending means 204;

Said sending means 204 transmits the encoded signals to the next level network node(s). Since the relay device has already known the type(s) and the specific encoding method(s) applied by the next level network node(s) from the processing indicating information sent by the base station, therefore, even if said next level network node is a mobile station, the signal encoded can still be received and detected by the receiver successfully.

Figure 5:
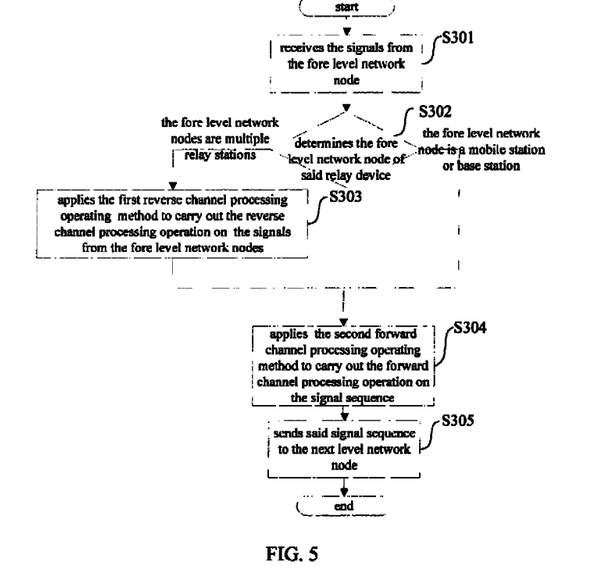
FIG. 5 is the flow chart of the method for implementing cooperative relay with multiple relay devices based on virtual multiple-input multiple-output in the relay device in wireless network according to an embodiment of the invention.

FIG. 5 is the flow chart of the method for implementing cooperative relay with multiple relay devices based on virtual multiple-input multiple-output (MIMO) in the relay device in wireless network according to an embodiment of the invention.

The method starts from the step S301, in the step S301, the relay device receives the signals from the fore level network node(s). According to the possible network topology, its fore level network node can be a mobile station, a base station or several relay devices, and as to different fore level network nodes, the relay device may carry out different operation on the signals arrived, therefore, the method needs to enter step S302.

In step S302, the relay device determines the fore level network node(s) according to the processing indicating information from the base station, for example, MAP information including the network topology and the signal processing method that each relay device applies. For example, from the MAP information, the relay device acknowledges the type(s) of the fore level network node(s), and also knows the signal processing method(s) of the fore level network node(s) correspondingly, such as the channel processing operating method including the forward and reverse operating method of the space multiplexing and the space diversity. As for the situation that the fore level network nodes comprise multiple relay devices, the consequent process on the signal by the relay device is different from the one in the situation that the fore level network node is a mobile station or a base station.

When it is determined that the fore level network nodes comprise multiple relay devices, the method enters the step S303.

In the step S303, according to said processing indicating information from the base station, the relay device performs the reverse channel processing operation on said signals with the first reverse channel processing operating method corresponding to the first forward channel processing operating method that said received signal employs. Wherein, the channel processing operating method can be obtained from said processing indicating information from the base station. Then the signal sequence after reverse channel processing operation is generated, and then the method enters the step S304.

In case that in the step S302, it is determined that the fore level network node is a mobile station or a base station, in general, the signals are original signals, therefore, the method enters the step S304 directly.

In the step S304, according to the processing indicating information from the base station including the information to indicate what channel processing operating method the relay device should apply, etc., the relay device uses the specific second forward channel processing operating method to carry out forward channel processing operation on the signal sequence after the first reverse channel processing operation in the step S303 or the original signals from the base station or the mobile station, so as to generate the signal sequence after forward channel processing operation. The method then enters the step S305.

In the step S305, the relay device transmits the signals after channel processing operation to the next level network node(s). Since the relay device has already known the type(s) and the specific channel processing operating method(s) applied by the next level network node(s) from the processing indicating information sent by the base station, therefore, even if said next level network node is a mobile station, the signal after forward channel processing operation can still be received and detected by the receiver successfully.

Figure 6:
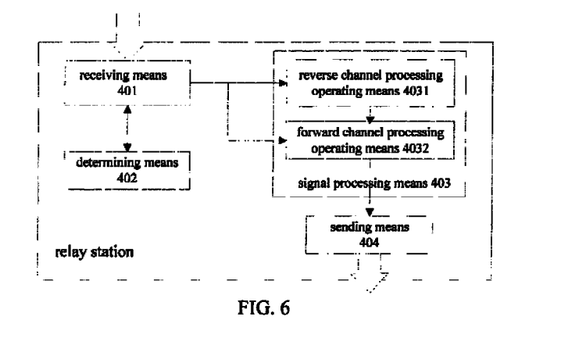
FIG. 6 is the block diagram of the relay device for implementing cooperative relay with multiple relay devices based on virtual multiple-input multiple-output in wireless network according to an embodiment of the invention.

FIG. 6 is the block diagram of the relay device for implementing cooperative relay with multiple relay devices based on virtual multiple-input multiple-output (MIMO) in wireless network according to an embodiment of the invention.

Said relay device comprises a receiving means 401, a determining means 402, a signal processing means 403 and a sending means 404, preferably, the signal processing means 403 further comprises a reverse channel processing operating means 4031 and a forward channel processing operating means 4032.

The receiving means 401 receives the signals from the fore level network node(s). According to the possible network topology, its fore level network node can be a mobile station, a base station or several relay devices, and as to different fore level network nodes, the relay device may carry out different operation on the signals arrived, therefore, therefore, the receiving means 401 needs the result determined by the determining means 402 to transmit said signals to the corresponding means.

The determining means 402 determines the fore level network node(s) according to the processing indicating information from the base station, for example, MAP information including the network topology and the signal processing method that each relay device applies. For example, from the MAP information, the determining means 402 acknowledges the type(s) of the fore level network node(s), and also knows the channel processing method(s) of the fore level network node(s) correspondingly) according to the processing indicating information from the base station (for example, including the network topology and the MAP information about the signal processing method that each relay device applies). As for the situation that the fore level network nodes comprise multiple relay devices, the consequent process on the signal by the relay device is different from the situation that the fore level network node comprises a mobile station or a base station.

When the determining means 402 determines that the fore level network nodes comprise multiple relay devices, the receiving means 402 transmit the obtained signals to a reverse channel processing operating means 4031.

The reverse channel processing operating means 4031, according to said indicating information from the base station, performs the reverse channel processing operation on said signals with the first reverse channel processing operating method corresponding to the first forward channel processing operating method that said received signal employs. Wherein, the channel processing operating method can be obtained from said processing indicating information from the base station. Then the signal sequence after reverse channel processing operation is generated, and then the signal sequence after reverse channel processing operation is conveyed to a forward channel processing operating means 4032.

When the determining means 402 determines that the fore level network node is a mobile station or a base station, in general, the signals are original signals, therefore, the receiving means 401 transmits the received signal directly to the aforesaid forward channel processing operating means 4032.

According to the processing indicating information from the base station including the information to indicate what channel processing operating method the relay device should apply, etc., the forward channel processing operating means 4032 uses the specific second forward channel processing operating method to carry out forward channel processing operation on the signal sequence after performed the first reverse channel processing operation in the reverse channel processing operating means 4031 or the original signals from the base station or the mobile station, so as to generate the signal sequence after forward channel processing operation and transmits said signal sequence to a sending means 404.

Said sending means 404 transmits the signals after performed channel processing operation to the next level network node(s). Since the relay device has already known the type(s) and the specific channel processing operating method(s) applied by the next level network node(s) from the indicating information sent by the base station, therefore, even if said next level network node is a mobile station, the signal after the channel processing operation can still be received and detected by the receiver successfully.

Figure 7:
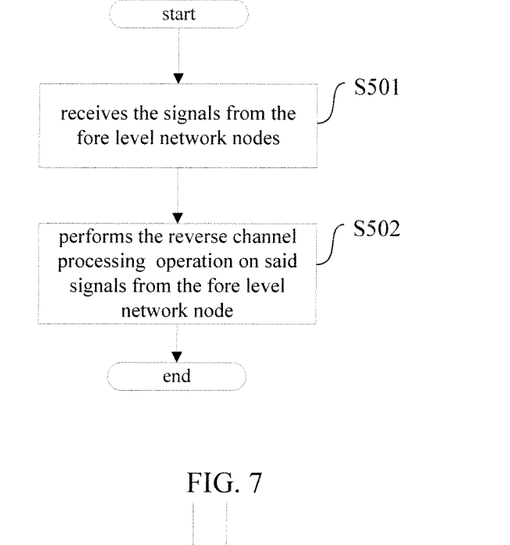
FIG. 7 is the flow chart of the method for implementing cooperative relay with multiple relay devices based on virtual multiple-input multiple-output in the base station in wireless network according to an embodiment of the invention.

FIG. 7 is the flow chart of the method for implementing cooperative relay with multiple relay devices based on virtual multiple-input multiple-output (MIMO) in the base station in wireless network according to an embodiment of the invention.

The method starts from the step S501, in the step S501, the base station receives the signals from the fore level network node(s) (according to the network topology and the technical problem the invention mainly concerns, said fore level network nodes are multiple relay devices) and the method enters the step S502.

In the step S502, performs the reverse channel processing operation corresponding to the forward channel processing operation employed by said fore level network nodes on said signal from the fore level network nodes.

Figure 8:
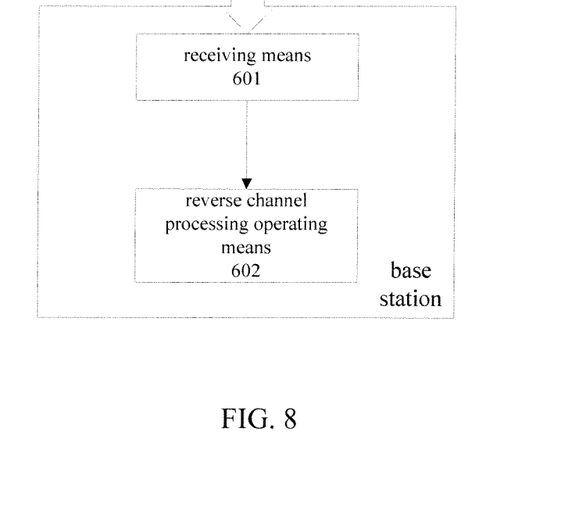
FIG. 8 is the block diagram of the base station for implementing cooperative relay with multiple relay devices based on virtual multiple-input multiple-output in wireless network according to an embodiment of the invention.

FIG. 8 is the block diagram of the base station for implementing cooperative relay with multiple relay devices based on virtual multiple-input multiple-output (MIMO) in wireless network according to an embodiment of the invention.

Said base station comprises a receiving means 601, for receiving the signals from the fore level network nodes (according to the network topology and the technical problem the invention mainly concerns, said fore level network nodes are multiple relay devices) and conveys the signals to a reverse channel processing operating means 602;

Said reverse channel processing operating means 602 is used for performing the reverse channel processing operation corresponding to the forward channel processing operation employed by said fore level network nodes on said signal from the fore level network nodes.

Figure 9:
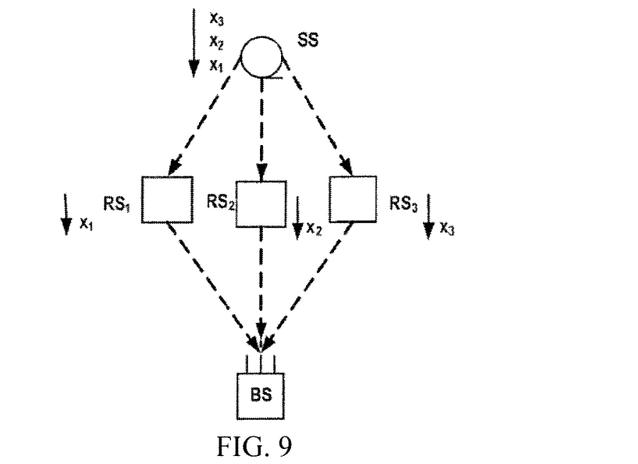
FIG. 9 illustrates the uplink of the multi-relay network applying space multiplexing method according to one embodiment of the present invention.

FIG. 9 illustrates the uplink of the multi-relay network applying space multiplexing method according to one embodiment of the present invention.

In the figure, the signals [X1,X2,X3] from the mobile station SS reaches a set of relay devices RS1, RS2, RS3 that are responsible for performing the cooperative relay for it Each of these relay devices is responsible for forwarding a part of the signal from SS (for example, RS1 takes the responsibility of forwarding X1, RS2 takes the responsibility of forwarding X2, RS3 takes the responsibility of forwarding X3) to the next level network node(s) (for example, the base station in the figure, BS), so that the resource which each relay device needs to realize the relay is only one third of the resource needed to transmit the complete original signal, therefore improves the throughput of the system.

Figure 10:
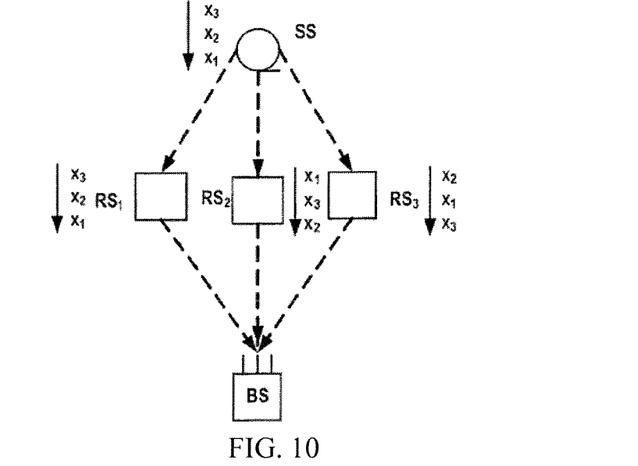
FIG. 10 illustrates the uplink of the multi-relay network applying space diversity method according to one embodiment of the present invention.

FIG. 10 illustrates the uplink of the multi-relay network applying space diversity method according to one embodiment of the present invention.

In the figure, the signals [X1,X2,X3] from the mobile station SS reaches a set of relay devices RS1, RS2, RS3 that are responsible for performing the cooperative relay for it. Each of these relay devices is responsible for forwarding a signal sequence with the same length as the original signal so as to obtain diversity gain. Preferably, the signal sequences can be the permuted copy of the original signal sequences, or keep the same as the original.

Figure 11:
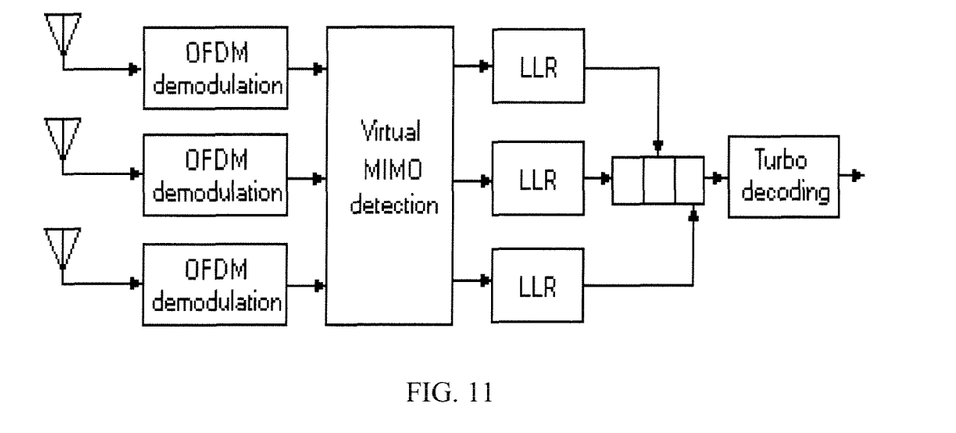
FIG. 11 illustrates the block diagram of the device for processing multiple branches of signals base on space multiplexing from multiple relay devices according to one embodiment of the invention.

FIG. 11 illustrates the block diagram of the device for processing multiple branches of signals based on space multiplexing from multiple relay devices according to one embodiment of the invention.

Wherein, the device comprises a base station and relay devices. The received multiple branches of signals are demodulated via regular OFDM, and are processed by a virtual multiple-input and multiple-output detecting means, after that, the multiple branches of signal sequences are recombined (since each of them are part of the original signals), decoded by the Turbo code, and then, the original signals are retrieved.

Figure 12:
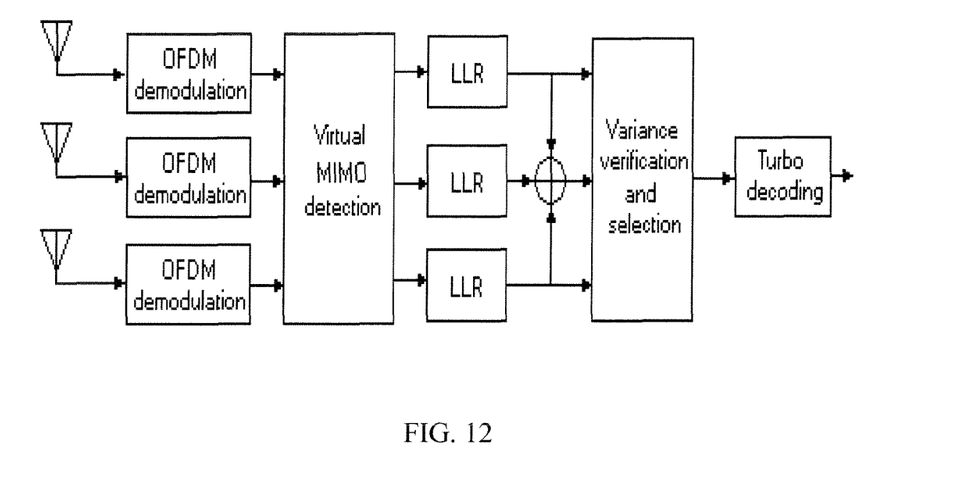
FIG. 12 illustrates the block diagram of the device for processing multiple branches of signals base on space diversity from multiple relay devices according to one embodiment of the invention.

FIG. 12 illustrates the device block diagram for processing multiple branches of signals based on space diversity from multiple relay devices according to one embodiment of the invention.

Wherein, the device can be set in a base station and relay devices. The received multiple branches of signals are demodulated via regular OFDM, and are processed by a virtual multiple-input and multiple-output detecting means, and then after the detection of logarithm likelihood ratios (LLR), the multiple signal sequences are gathered to compare and select the best signal to be conveyed to the Turbo code to decode.

Although the embodiments of the present invention have been described above, it is understandable by those skilled in the art that various modifications can be made without departing from the scope and spirit of the scope of the attached claims.

What is claimed:

1. In a wireless telecommunication network, a method for performing a cooperative relay with multiple relay devices, said method comprising the following steps:

receiving signals at a receiving node from at least one fore level network node sending the signals to the receiving node, said at least one fore level network node being one of a plurality of types, said plurality of types including a mobile terminal, a base station and at least one relay device;

according to processing indicating information received at the receiving node from a base station, applying specific encoding and decoding methods to process said received signals, wherein the processing indicating information includes at least one of information from which the particular type of the fore level network node is determinable and information from which is determinable a first encoding method, if any, employed by the at least one fore level network node; and sending said processed signals to at least one next level network node.

2. The method according to claim 1, wherein said applying comprises:

when said at least one fore level network node comprises multiple relay devices, executing the following operations:

according to said processing indicating information from the base station, decoding the received signals with a first decoding method corresponding to the first encoding method that the received signals employ, so as to generate a decoded signal sequence;

according to said processing indicating information from the base station, encoding said decoded signal sequence with a specific second encoding method, so as to generate an encoded signal sequence.

3. The method according claim 1, wherein said applying further comprises the steps of:

when said at least one fore level network node is a mobile station or a base station, executing the following operation:

encoding the received signals with a second encoding method corresponding to said receiving node, so as to generate an encoded signal sequence.

4. The method according to claim 1, characterized in that, said specific encoding and decoding methods comprise at least one of space-time encoding and decoding and space-frequency encoding and decoding.

5. A relay device in a wireless telecommunication network, for performing a cooperative relay with at least one other relay device, comprising:

a receiver that receives signals from at least one fore level network node sending the signals to the receiver, said at least one fore level network node being one of a plurality of types, said plurality of types including a mobile terminal, a base station and at least one other relay device;

a signal processor that, according to processing indicating information received at the receiving node from a base station, applies specific encoding and decoding methods to process said received signals, wherein the processing indicating information includes at least one of information from which the particular type of the fore level network node is determinable and information from which is determinable a first encoding method, if any, employed by the at least one fore level network node; and a transmitter that sends said processed signals to at least one next level network node.

6. The relay device according to claim 5, further comprising a determining part that, according to said processing indicating information from the base station, determines a configuration and corresponding encoding and decoding methods of the at least one fore level network node of said relay device; and said signal processor further comprising:
a decoder, used when said at least one fore level network node comprises multiple relay devices, that, according to said processing indicating information from the base station, decodes the received signals with a first decoding method corresponding to the first encoding method that the received signals employ, so as to generate a decoded signal sequence; and
an encoder that, according to said processing indicating information from the base station, encodes said decoded signal sequence with a specific second encoding method, so as to generate an encoded signal sequence.

7. The relay device according to claim 5, wherein said specific encoding and decoding methods comprise at least one of space-time encoding and decoding and space-frequency encoding and decoding.

8. A relay device in a wireless telecommunication network, for performing a cooperative relay with at least one other relay device, comprising:
a receiver that receives signals from at least one fore level network node;
a signal processor that, according to processing indicating information from a base station, applies specific encoding and/or decoding methods to process said received signals; and
a transmitter that sends said processed signals to at least one next level network node;
wherein said signal processor includes an encoder that is further used, when said at least one fore level network node is a mobile station or a base station, to encode the received signals with a specific second encoding method corresponding to said relay device, so as to generate an encoded signal sequence.

9. In a wireless network, a method for implementing cooperative relay with multiple relay stations, comprising the following steps:
receiving signals from at least one fore level network node based on virtual multiple-input multiple-output, said at least one fore level network node being one of a plurality of types, said plurality of types including a mobile terminal, a base station and at least one relay device;
according to processing indicating information received at the receiving node from a base station, applying a specific channel processing operating method to carry out a channel processing operation on said received signals, so as to generate a signal sequence after channel processing operation, wherein the processing indicating information includes at least one of information from which the particular type of the fore level network node is determinable and information from which is determinable a first forward channel processing operating method, if any, employed by the at least one fore level network node; and
sending said signal sequence after channel processing operation to at least one next level network node.

10. The method according to claim 9, wherein said applying comprises:
when said at least one fore level network node comprises multiple relay devices, executing the following operations:
according to said processing indicating information from the base station, performing a reverse channel processing operation on said signals with a first reverse channel processing operating method corresponding to the first forward channel processing operating method that the received signals employ, so as to generate the signal sequence after reverse channel processing operation;
according to said processing indicating information from the base station, using a specific second forward channel processing operating method to carry out forward channel processing operation on the signal sequence after performed reverse channel processing operation, so as to generate the signal sequence after performed forward channel processing operation.

11. The method according claim 9, wherein said applying further comprises the steps of:
according to said processing indicating information from the base station, when said at least one fore level network node is a mobile station or a base station, executing the following operations:
using a second forward channel processing operating method corresponding to said relay device to perform a forward channel processing operation on said received signals, so as to generate a signal sequence after performed forward channel processing operation.

12. The method according to claim 9, wherein said specific channel processing operating method comprises at least one of a forward and reverse operating method of a space multiplexing and space diversity.

13. A relay device in a wireless network, for implementing cooperative relay with multiple relay devices, comprising:
a receiver that receives signals from at least one fore level network node based on virtual multiple-input multiple-output, said at least one fore level network node being one of a plurality of types, said plurality of types including a mobile terminal, a base station and at least one other relay device;
a signal processor that applies a specific channel processing operating method to carry out a channel processing operation on said received signal, so as to generate signals after channel processing operation, wherein the processing indicating information received at the receiver includes at least one of information from which the particular type of the fore level network node is determinable and information from which is determinable a first forward channel processing operating method, if any, employed by the at least one fore level network node; and
a transmitter that sends said signals after channel processing operation to at least one next level network node.

14. The relay device according to claim 13, wherein, said relay device further comprises a determining part that, according to processing indicating information from a base station, determines the fore level network nodes and a corresponding channel processing operating method thereof;
said signal processor further comprises:
a reverse channel processing operating part that, when said fore level network nodes comprise multiple relay devices, according to said processing indicating information from the base station, performs a reverse channel processing operation on said signals with a first reverse channel processing operating method corresponding to the first forward channel processing operating method that the received signals employ, so as to generate a signal sequence after reverse channel processing operation;
a forward channel processing operating part that, according to said processing indicating information from the base station, uses a specific second forward channel processing operating method to carry out forward channel processing operation on the signal sequence after performed reverse channel processing operation, so as to generate the signal sequence after performed forward channel processing operation.

15. A relay device in a wireless network, for implementing cooperative relay with multiple relay devices based on virtual multiple-input multiple-output, comprising:
   a receiver that receives signals from at least one fore level network node;
   a signal processor that applies a specific channel processing operating method to carry out a channel processing operation on said received signal, so as to generate signals after channel processing operation; and
   a transmitter that sends said signals after channel processing operation to at least one next level network node;
   wherein said signal processor includes a forward channel processing operating part, said forward channel processing operating part being further used, when said fore level network node is a mobile station or a base station, such that a second forward channel processing operating method is used to perform a forward channel processing operation on said received signal, so as to generate the signal sequence after performed forward channel processing operation.

16. The relay device according to claim 13, wherein, said specific channel processing operating method comprise at least one of a forward and reverse operating method of a space multiplexing and space diversity.

* * * * *